March 15, 1927.

F. E. OILER 1,621,024

MOVING PICTURE CAMERA AND PROJECTOR

Filed March 27, 1924   3 Sheets-Sheet 1

Inventor
Frank E. Oiler
By Frank D. Gray
Att'y

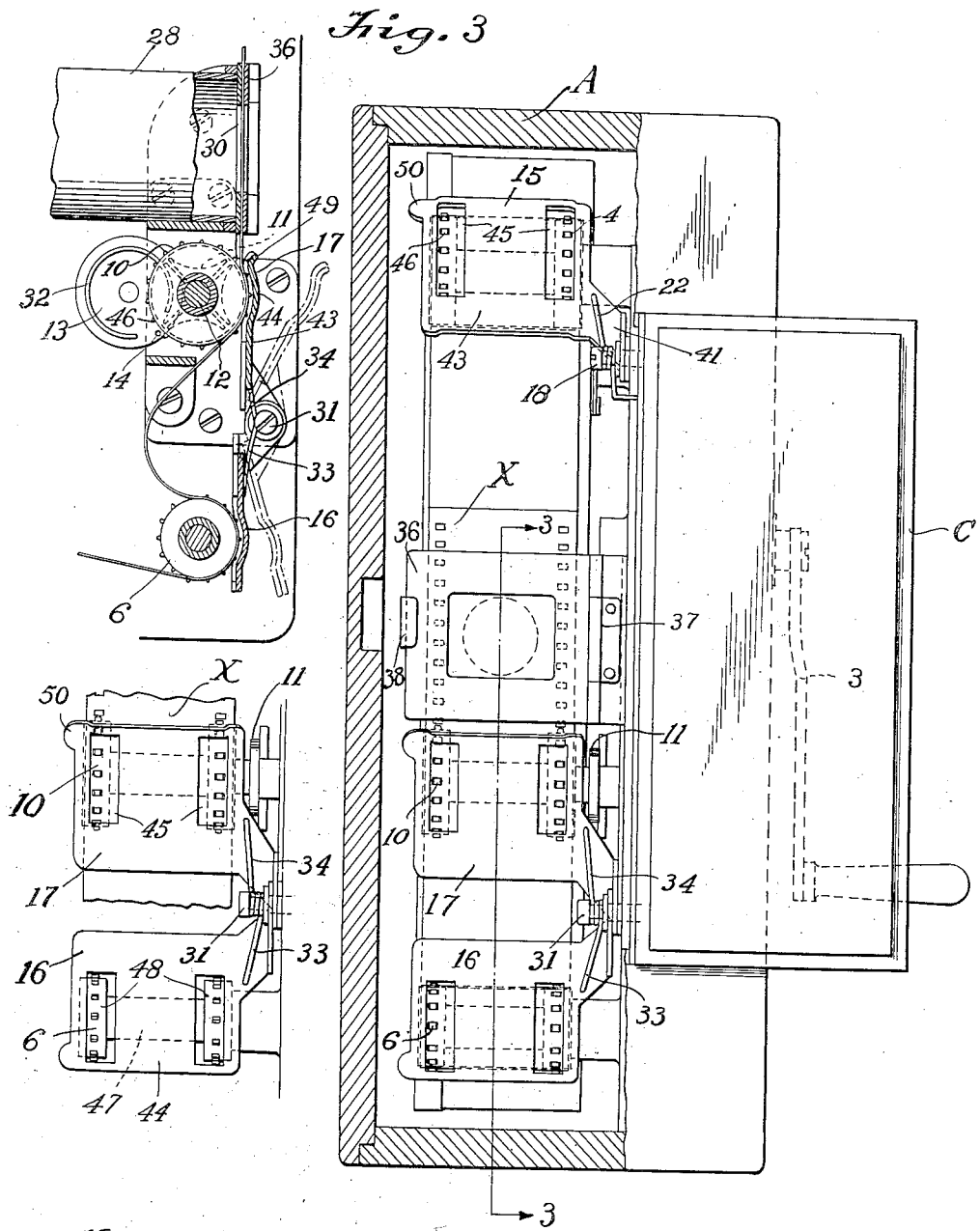

March 15, 1927.

F. E. OILER 1,621,024

MOVING PICTURE CAMERA AND PROJECTOR

Filed March 27, 1924    3 Sheets-Sheet 3

Inventor
Frank E. Oiler
By Frank D. Gray
Att'y

Patented Mar. 15, 1927.

1,621,024

UNITED STATES PATENT OFFICE.

FRANK E. OILER, OF DETROIT, MICHIGAN.

MOVING-PICTURE CAMERA AND PROJECTOR.

Application filed March 27, 1924. Serial No. 702,285.

This invention relates to motion picture machines and especially to structure making possible its use as a photographic camera for animated pictures and as a projector for the latter, all mechanism being combined in a single casing and mounted upon a unitary frame.

Among the objects of my invention is the provision of a winding reel for receiving the film thereon, driven frictionally and having a yieldable mounting for pivoting said reel thereon in a manner that will permit slight yielding movement of the reel though normally urged into a concentric position on said pivot.

A further object of my improved mechanism is the provision of a novel tension and guide mechanism for guiding very accurately the film as it is directed over the periphery of a driving sprocket so that the teeth of the sprocket are held quite positively in the notches of the film to prevent accidental injury to the latter as well as insuring the entrance of the teeth in the notches as the film moves over the sprocket.

It is a still further object of my invention to provide a tension or brake mechanism for the guiding film sprockets which shall be mounted adjacent the latter, urged against their convex surface, and yet be provided with arc-shaped surfaces which follow the edges of the film without contacting the intermediate surface on which the pictures are shown.

It is a still further object of my structure to provide a novel detachable connection between the winding reel and its yieldable drive pivot, so that when the reel has been filled with the proper length of film, the wound reel may be readily detached from said driving pivot, and another empty reel substituted, if desired.

It is a further object of this mechanism to provide a lens tube holding the lens intermediate its ends, with the shutter rotatable across one of its open ends and the film strip driven across the other, thus permitting direction of the light rays through said tube in one direction when using as a camera but in the opposite direction when projecting, though the lens is undisturbed in said tube in making the change of operation, and is fully shaded at all times.

With these and other objects in view my invention consists in the improvements more fully described in the following specification, recited in the appended claims, and illustrated in the accompanying drawings in which:

Figure 2 is an elevation of the rear end of the casing with the rear door open and parts of the walls broken away;

Figure 3 is a detail section view taken on the line 3—3 of Fig. 2;

Figure 4 is a detail rear view of the sprocket and guide wheels for the film;

Figure 1:
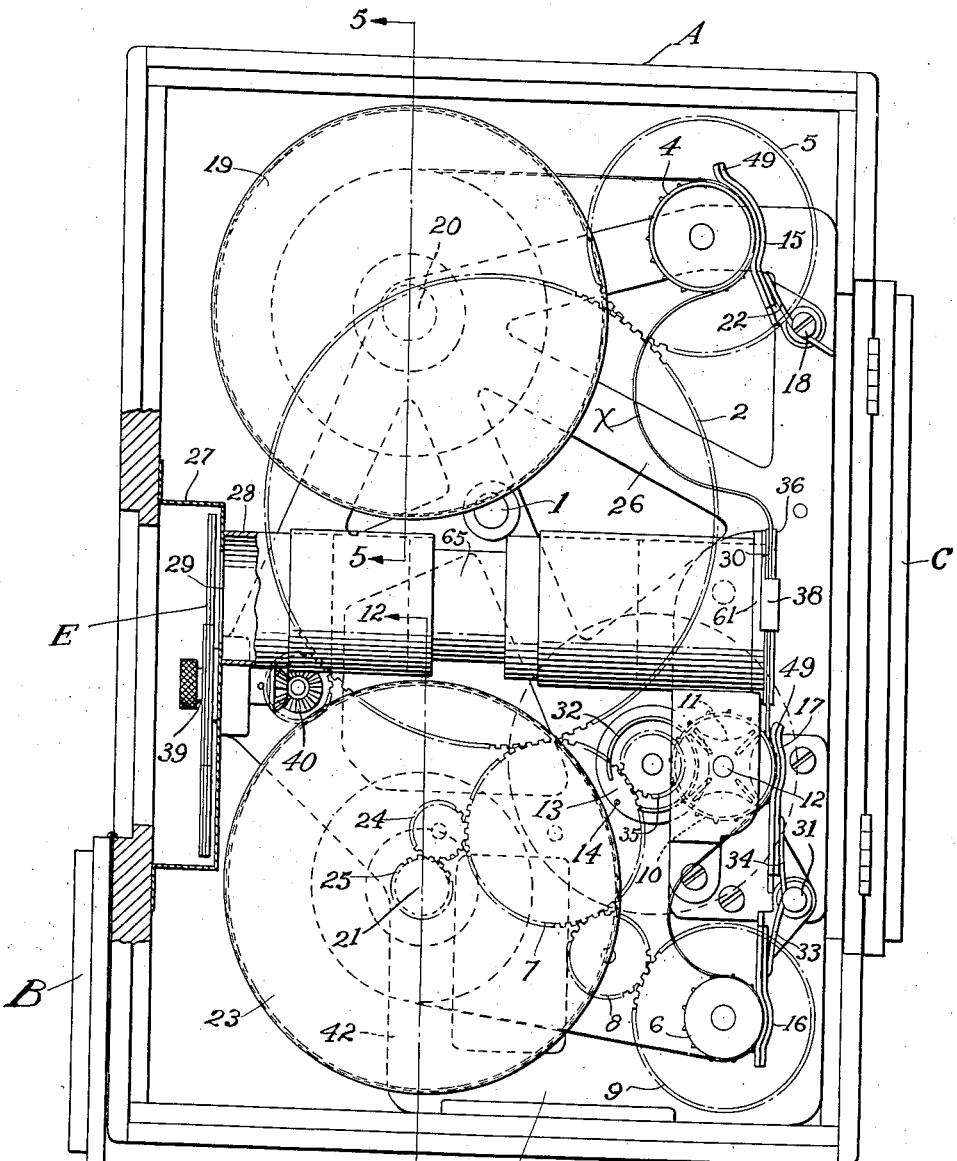
Figure 1 is a side elevation of the casing with a side door swung to open position, front and rear doors, parts of the front wall of the casing and the lens tube broken away and the shutter housing in section.

In the drawings in which like reference characters designate like parts throughout the several views, A is the casing enclosing the entire mechanism while B and C refer to the front and rear doors of the casing, respectively, the former indicating the door swung down in Fig. 1 to expose the shutter and C swung laterally on vertical hinges to expose the film end of the lens tube to an artificial light in projecting, or to be closed to operate as a camera. D designates the skeleton frame mounted within the case and upon which the various operating mechanisms are mounted. E is the shutter.

The said mechanism includes means for passing the film from one reel to another and across the end of the lens tube adjacent the door C. Such means comprises a master drive wheel 2 mounted rotatively upon the main shaft 1 which is fixed upon the frame D. A drive crank S is detachably connected to said wheel 2, so that it may be removed from the external face of the casing wall for packing or storage purposes. See Fig. 2.

A sprocket 4 together with a gear 5 is mounted in an upper corner of the case and a sprocket 6 together with a gear 9 is mounted in a corresponding lower corner. Both these sprockets positively feed the film about their peripheries, as shown in the drawings. Gears 7 and 8 constitute a gear train connecting gear 9 with master gear 2, while gear 5 is geared directly to 2. A sector brake element 15 is hinged to a pivot 18 and normally pressed against the periphery of the sprocket, by a coil spring 22 as shown, while a corresponding brake 16 is pivoted upon the pin 31, and normally is urged against the sprocket 6.

Between the said sprockets 4 and 6, is mounted a step-by-step sprocket 10 driven intermittently by the well-known Geneva stop movement comprising the star wheel 11 mounted on pivot 12, and the balance wheel 13 carrying the sector rim 32 and actuating pin 14, as shown in Figs. 1 and 3. The said balance wheel 13 is in turn mounted upon and driven by gear 35 which itself meshes with gear 7, so that the sprocket 10 will be driven intermittently from the driver 2, as will be understood. A brake element 17 is urged against the sprocket 10, and the two brakes 16 and 17 are pivotally mounted upon the same pin 31, though they are urged in opposite directions by springs 33 and 34.

The film may be unwound from reel 19 pivoted at 20 to the frame D, and rewound below upon a reel 23 pivoted at 21. To the lower reel is fixed a gear 25 which is geared to 7 by gear 24, whereby reel 23 is driven from drive wheel 2 but in opposite direction thereto, as are also sprockets 4, 6 and 10. If, therefore, the crank is driven in clockwise direction, as it appears in Fig. 2, the film will be unwound from reel 19 continuously, while parts 4, 6, 19 and 23 will rotate in clock-wise direction as they appear in Fig. 1, though 19 will be unwound from the upper surface and 23 wound upon its lower surface. Sprocket 10 will also rotate clockwise but intermittently, and loops will be formed in the film $x$ between 10 and sprockets 4 and 6.

The frame D is composed of integral strips of metal, preferably, designated in the drawings by numerals 26 and 42, the latter frame parts being mounted on the back wall of the casing in spaced relation thereto, so that some parts are mounted between the frame and wall, while others are mounted on said strips on the opposite side from the case wall.

The shutter E is enclosed within a box 27 having suitable flanges secured to the casing wall in registry with the opening formed by dropping the door B. The vertical wall of said box has an aperture 29 adjacent one corner in registry with which the lens tube 28 extends rearwardly across the camera almost to the door C, the forward end of the tube being fixedly secured to the box 27. A square plate 30 is mounted on the frame in position at the rear end of the tube and at right angles thereto, and is provided with a rectangular aperture of the size of the sight in a standard film and in registry with the tube axis. Accordingly, the attachment of the rear end of the tube 28 to the said plate about said aperture will enable the proper support of the tube upon the frame through the intermediacy of the plate 30. The attaching means will be described in detail in referring to the particular lens structure.

Another plate 36 having the same contour and similar aperture as plate 30 is hinged at 37 to one edge of plate 30 and but slightly spaced therefrom, so that, when the plates are in closed relation, the film $x$ may be guided between the two plates and across the rear end of the tube in its passage from sprocket 4 to sprocket 10. A flanged latch 38 is hinged on plate 30 and is adapted to lock the edges of the two plates together.

The shutter E is mounted for rotation on its axis 39, and is usually composed of radial vanes or blades the relation between which may be adjusted in a manner not especially concerned with the subject matter of this application. These blades forming the shutter are rotated across the opening 29 by the bevel gears 40 which are driven ultimately from the common master gear 2.

I make use of a novel and improved film guide for use in guiding the film over the periphery of the sprocket units. The three guide units 15, 16 and 17 are substantially alike as illustrated in Figs. 1 to 4 of the drawings, all three being pivotally mounted upon a frame element by an arm, such as 41 which is usually integral with the main part of the guide. The particular feature of my improved guide which is especially advanced over the prior art, is the structure thereof enabling the guide to contact the outer edges only of the film, just outside of the notches therein adapted to receive the teeth, such as 46 of the usual sprocket. It is a particular advantage in the use of my guide, that the part thereof intermediate the teeth of the sprocket shall contact the film surface very lightly only, since the rear face of the film is practically unsupported between said teeth. The structure by which the results are obtained is as follows: The guide is composed of a flat portion 43 which is nearest the pivoting arm 41, this flat portion being normally out of contact with the film, and a curved portion 44 at a point farthest from the pivot. This arc 44 conforms quite accurately to the curve of the standard film sprocket which usually comprises cylindrical ends 48 mounted on a reduced shaft portion 47. Each guide, as viewed in elevation, is provided with two vertical slots 45 which are longer than the extent of contact of the guide on the cylinder, and of sufficient width to expose the ends of the teeth 46 therethrough and also to extend toward the mid-portion of the guide beyond the inner edge of the cylinders, so that between the teeth of the cylinders the guide shall not press upon the film with any appreciable force, as the latter is there unsupported. The farther edge of the guide is curved outward at 49 to easily direct the film strip toward the sprocket, if it is desired. Where the film is to be guided rather abruptly away from the sprocket, as from 6, the edge of the guide may be held in the plane of the same.

A finger tip 50 is provided for convenience in operating the guide in releasing the film. The outer edges of the slots 45 are normally pressed against the film upon the cylinders 48 by the force of the coil springs 22, 33 and 34. Thus, the film is held quite positively between the guide and the sprocket at points exterior of the teeth, though there is no gripping action between said parts at other points. The said slots permit very positive actuation of the film by the sprocket teeth without the latter contacting the guide plate.

The reels 19 and 23 are constructed as follows: The body part of said reels comprises a disc portion apertured centrally at 51, and flanged at 52 to form a casing or cover, a flanged cover 53 being provided for telescoping the body and wholly enclosing the wound film within. An axial tubular part 54 is slightly shorter than the depth of the case and is secured to the apertured disc portion by means of a flanged cylindrical collar member 55 engaging the tubular and casing members, said member 55 engaging the interior of the casing and a collar 56 engaging the exterior of the casing as shown clearly in Fig. 6. At the farther end of the tube 54, a cap 57 closes the tube, and the parts 55 and 57 are provided with peripheral hooks 58 spaced sufficiently to receive thereon the film notches of a standard film, so that the end of the film will be readily attached to the tubular part 54 for winding.

Cut out from the flange part of the collar 56 at the exterior of the casing, are outwardly-bent hooks 59, the same being further bent circumferentially for a purpose described later. The casing and axial supporting elements therefor are mounted upon the frame D as follows: A fixed pin 70 projects from some convenient part of D and receives thereon at the outer end and contiguous to the frame, respectively, cup members 71 and 72, the latter being next the frame and provided with spaced projecting arms 73 of the same number as the teeth 59, so that relative rotation of the arms on the pin 70 will enable the arms to become locked in said teeth to detachably secure 72 upon the casing. The two cups 71 and 72 support the tube part 74 thereon when the latter is rather tightly crowded upon the hub part of the cup 72 and cup member 71 is inserted in the end of the tube. By this arrangement the tube and its end supports may rotate quite freely upon the pin 70.

Figure 12:
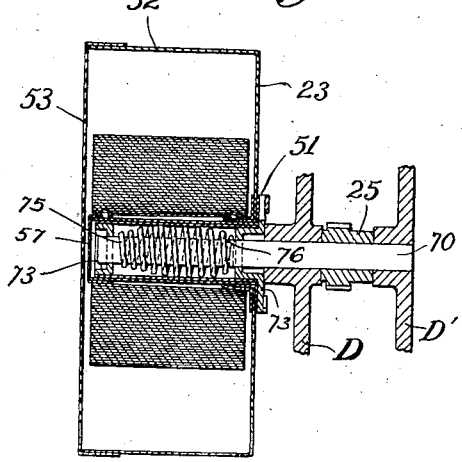
Figure 12 is a sectional view of the winding reel, taken on the line 12—12 of Fig. 1.

The two tubes or drums 54 and 74 are of suitable size and length as to engage telescopically, the latter within the other; and if no further structure is made use of to connect them together, the casing and spindle 54 will be permitted to unwind the film from the reel as the film is drawn from its periphery. If however, it is desired to positively wind the film upon the spindle, the latter is driven by the following means: The pin or shaft 70 is mounted for rotation upon spaced frame pieces D and D', as shown in Fig. 12, and the gear 25 is fixed thereon between the said pieces, so that power applied to the gear will drive the shaft and therefrom the reel spindle, such as 54. Within the tube 74, in this construction, a helical spring member 75 is mounted upon the shaft 70, being somewhat larger normally than the said tube 74, so that compression of the spring radially is essential to insert the latter within the tube. The spring 75 is oval-shaped, so that the mid-point of the same contacts the interior of the tube with greatest pressure. One end of the spring is inserted in a transverse aperture of the shaft at 76, whereby the rotation of the latter will drive the spring, and by it the reel spindle by friction. The opposite end of the spring 75 is loose upon the shaft so that a limited rotation of the latter is permitted relative to the part 74, and the interlocked parts 59 and 73 allow rotation of the parts 71, 72 and 74 upon the shaft 70 and driving of the tube 54 in one direction, while relative rotation in the other direction permits separation of the tubes for the purpose of removing the tube 54 and casing 52 when the reel is filled by the wound film. The cup members 71 and 72 are centrally apertured to permit threading the same on the shaft member at opposite ends of the spring 75.

Figure 6:
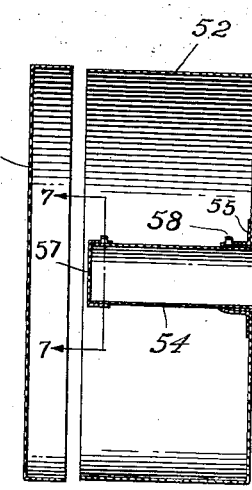
Figure 6 is a similar section but with the cover raised, and the mounting spindle removed.
Figure 8:
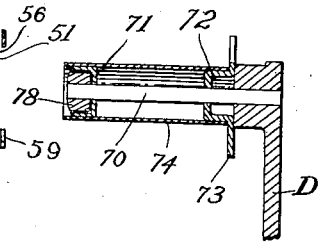
Figure 8 is a longitudinal section of the holder spindle.

The above structure has very unique advantages in that the various parts may be so readily disassembled, or easily reassembled when it is desired. Fig. 6 shows the reel removed from the spindle 74, and a further dismemberment of the parts may be made by removing the inner end of the tube 74 from its seat 77 on the cup 72, the outer cup 71 remaining usually quite tightly secured within the corresponding end of the tube.

A plug 78 is usually inserted within the open end of the cup 71 and serves to hold the cup upon the pin 70. When the tube structure is to be used for winding the film upon the spindle, the plug is not needed, and is omitted. The great advantage of the spring construction lies in the fact that undue temporary resistance to the uniform winding speed of the film is met by the continued rotation of the gear 25 and shaft 70, at the same time permitting a brief slackening of the actual speed of the reel tube 54 until the point of such increased resistance is passed, when the film reel and spindle 54 will automatically speed up in its rotation and again reach a normal relative position upon the shaft 70. Thus the general average speed of the film as it is being wound upon the reel 23, will be substantially identical with that of the unwinding speed of the film from the reel 19, the film loops between the sprockets 4 and 10, and between 10 and 6, making possible the slight temporary variations in speed in the winding at reel 23, above referred to.

Figure 10:
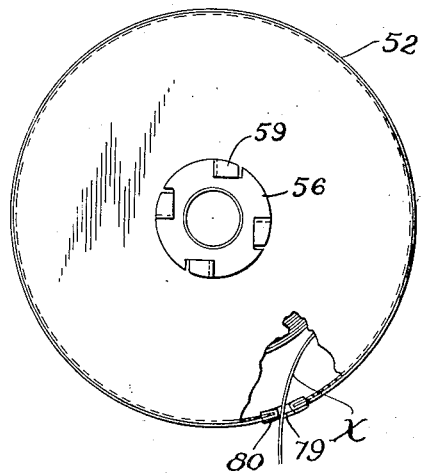
Figure 10 is a face view of the film holder with parts broken away.
Figure 7:
Figure 7 is a transverse section on the line 7—7 of Fig. 6.
Figure 9:
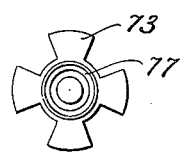
Figure 9 is a face view of the latch mechanism for the holder.
Figure 11:
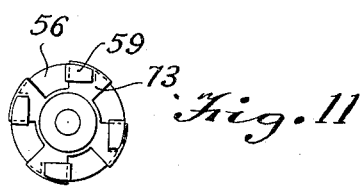
Figure 11 is a face view of the latching mechanism for the holder showing the parts in interlocking relation.

The reel casings 52 are provided with peripheral slots 79, shown in Fig. 10, through which the film x may be led for winding or unwinding, and the edges of these slots are covered with a felt or other smooth textile material 80 which will exclude the light from the interior of the reels for obvious reasons.

Figure 13:
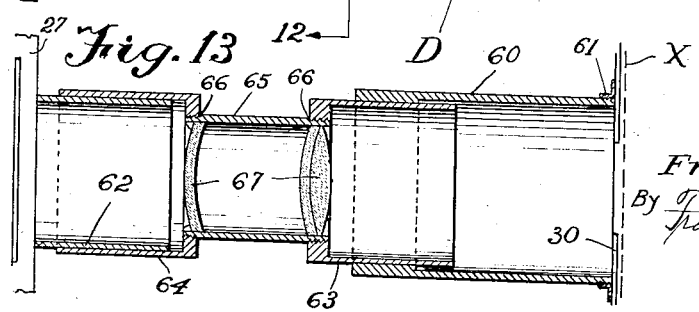
Figure 13 is a central, longitudinal section of the lens tube.
Figure 5:
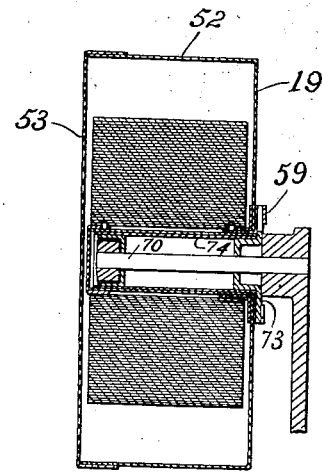
Figure 5 is a central, vertical section of a film holder and a mounting therefor, taken on the line 5—5 of Fig. 1.

The lens tube 28 is shown in detail in Fig. 13 of the drawings, and comprises telescopic cylindrical sections as will now be described, for the purpose of making the same easily disassembled when it is desired to cleanse or repair the lens glasses. The latter referred to generally by the numerals 67, are not patentable, per se, but their mounting within the tube 28 intermediate the ends which are attached to the shutter box 27 and the plate 30, is believed to be novel and highly advantageous. The said tube 28 comprises a cylindrical section 62 which is fixedly secured at one end to the shutter case 27, by soldering or otherwise, and has smooth interior and exterior surfaces. At the other end of the tube is a flanged ring 61 similarly secured to the plate 30, and provided with interior threads of fine gage. Another cylindrical section 60 has a smooth interior surface and an exterior threaded end registering within the ring 61.

The lens glasses are directly mounted within a tube section 65 which is threaded exteriorly at either end and adapted to be received within the circular openings (threaded) 66 in the ends of cylindrical sections 63 and 64, which latter fit telescopically within the inner end of section 60 and without 62, respectively, so that parts 60 and 62 are fixed in position, though detachable as to the former part, while parts 63, 64 and 65 are movable as a unit longitudinally relative to parts 60 and 62 by sliding movement, whereby the position of the lens glasses may be positioned nearer either the shutter or the film, as may be desired.

The tube may be assembled in position as follows: The lens tube part 65 with the lens glasses therein is screwed into the parts 63 and 64, after which the section 63 is inserted within the smooth end of the tube 60. The parts are then held in alinement with the axis of the part 62 until the part 64 can be telescoped over the part 62, and the tube 60 is then screwed into the threaded ring 30, after which the tube 65 may be positioned relative to the other parts by sliding longitudinally thereupon.

From the foregoing it will be apparent that I have provided a camera for motion pictures in which the lens tube is positioned lengthwise between the shutter and the film plates, and at the same time laterally between the two reels, the film moving from one to the other; that I have provided an improved structure for such reels that will be particularly practicable for use in feeding the film across the end of said lens tube; that I have also improved the brake guide plate for the film as it travels across the periphery of the sprocket, to render the movement of the film from one reel to the other more efficient and accurate in its speed of travel; and that these features cooperate to produce a mechanism that is easy to operate, even by those persons wholly unskilled in photography, and that may be controlled by amateurs by merely properly positioning the casing in vertical position or other situation facing the objects when taking, or the screen when projecting. It is evident that the mechanism is simple as the nature of the devices will permit, and that the same may be manufactured at very reasonable cost.

What I claim as my invention and desire to secure by Letters Patent is:

1. In a combined moving picture camera and projector of the character indicated, the combination of a casing, a pair of reels in spaced relation, means to support the reels within said casing for the unwinding of the film from one reel and taking up the same on the other, a rotating shutter and a lens tube within said casing, the tube being mounted intermediate the said reels, means for actuating the film from one said reel to the other, means including a pair of apertured plates for guiding the said film across the end of said tube remote from said shutter, means for actuating the shutter for movement across the other end of the tube and doors in the wall of said casing adjacent the ends of said tube, whereby the shutter door may be open and the opposite door closed when taking pictures upon the film, and the film door may be opened for presenting artificial light in the vicinity of the film when it is desired to project pictures upon a screen beyond the shutter end of the tube.

2. In a combined picture machine as described, a casing, film holding and actuating means, a frame supporting the holding and actuating means within said casing, said frame having an opening therein constituting a picture field, a movable shutter and the lens tube within said casing, said tube being mounted in alinement with said field and having one end adjacent the latter, means for actuating the shutter for movement across the tube axis adjacent said field, means to guide the film across the opposite end of the tube, and a swinging door in the wall of the casing adjacent the film end of the tube, which may be opened for presenting artificial light to project pictures upon a screen beyond the shutter end of the tube, and may be closed when taking pictures upon the said film when the latter is moved across the tube in a sensitive condition.

3. In a combined picture machine as described, a casing, film holding and actuating means, a frame supporting the actuating means within the casing, said frame having an opening constituting a picture field, a rotating shutter and a lens tube within said casing, the said tube being mounted in alinement with said field with one end adjacent said shutter, said actuating means tending to move the film across the other end of said tube, comprising a plurality of sprocket wheels and a segmental brake element pivoted on a fixed fulcrum of the frame and normally spring-pressed against the sprocket and having peripheral slots to receive therein the teeth of the sprocket, and a door in the casing wall adjacent the film end of the tube which may be opened for presenting artificial light therethrough when projecting pictures, and which may be closed when taking pictures upon a sensitive film.

4. In a combined moving picture camera and projector of the character indicated, the combination of a casing, a pair of reels, means to support the reels within said casing for the unwinding of the film and taking up the same, a rotating shutter and a lens tube within said casing, the tube mounted intermediate the said reels, means to move the film between the reels and across one end of the tube and means for unwinding the film from one reel and winding it on the other, the winding reel comprising a driving shaft therefor, a pair of cup members rotatably mounted on the shaft and supporting the hollow hub of the reel thereon, a coil spring intermediate the hub and shaft and encircling the latter, one end of the spring being fixed to the shaft, the remainder of the spring being loose upon the shaft thereby permitting yielding relative rotation of the reel and shaft to a limited extent.

5. A drive mounting for a film reel comprising a driving shaft therefor, a pair of cup members rotatably mounted on the shaft and supporting the hollow hub of the reel thereon, a coil spring intermediate the hub and shaft and encircling the latter, one end of the spring being fixed to the shaft, the remainder of the spring being loose upon the shaft, thereby permitting relative rotation of the reel and shaft to a limited extent.

6. A driving mounting for a film reel comprising a driving shaft therefor, a pair of cup members rotatably mounted upon the shaft and supporting the hollow hub of the reel thereon, one of said cups being adjacent the outer end of the shaft and the other spaced from the first, a hollow drum or tube detachably secured upon said cups and the peripheral edges of one of the latter extending radially beyond said drum and provided with projecting arms, a second hollow tube or drum secured to the reel axially and fitting closely over the first telescopically to provide a ready means of detachment from the cups and shaft, the inner end of said second drum having peripherally extending spaced teeth externally of the wall of the reel casing and registering with the said arms whereby the arms and teeth may be detachably locked rotatably, a coil spring intermediate the shaft and the smaller of the said drums and encircling the shaft, one end of the spring being fixed to the shaft, and the remainder of the spring being loose upon the same, thereby permitting a limited, yielding and relative rotation of the reel and shaft.

7. In a combined moving picture camera and projector of the character indicated, the combination of a casing, a pair of reels, means to support the reels within the said casing for the unwinding of the film and taking up the same, means for actuating the winding reel including a driving shaft therefor and yielding means for rotating the reel body from said shaft, guiding means for the film between the two reels, the same including a sprocket having teeth spaced to register with the slots in a standard film and comprising spaced cylindrical ends connected by a reduced shaft portion, and a segmental brake element pivoted on a fixed fulcrum of the frame and normally spring-pressed against the sprocket, and having peripheral slots to receive therein the teeth of the sprocket, whereby the pressure exerted on the film by said brake element is applied wholly outside the sprocket teeth.

8. In a combined motion picture camera and projector of the character described, the combination of a casing, film holding and actuating means, a frame supporting the actuating means within the casing, said frame having an opening constituting a picture field, a lens tube mounted within said casing and in alinement with said field, said actuating means tending to move the film across one end of the said tube, and comprising a sprocket guide element intermittently operated and a sprocket guide element continuously operated, each of said sprockets having spaced cylindrical ends connected by a reduced shaft portion, a pair of segmental brake elements pivoted on a common fixed fulcrum of the frame, a brake element of said pair being spring-pressed against each of said sprocket elements, each of said brake elements having peripheral slots to receive therein the teeth of the sprocket.

9. A pivoted film guide and brake element for sprockets having spaced enlarged cylindrical toothed portions united by a reduced shaft portion, comprising a segmental plate portion fitting the curvature of the said toothed portions and having peripheral spaced slots adapted to receive therein the teeth of said portions, whereby the film will be unsupported between said enlarged portions of the sprocket but positively guided and yieldingly pressed between the brake element and said enlarged portions outside of said teeth and adjacent the film edges only.

10. In a combined motion picture camera and projector of the character described, the combination of a casing, film holding and actuating means, a frame supporting the actuating means within the casing, said frame having an opening constituting a picture field, a rotating shutter and a lens tube within the said casing, the tube mounted in alinement with said field, means for actuating said shutter to rotate across the end of the said tube adjacent the said field, a plate fixed exteriorly to the opposite end of said tube and having an aperture registering with the axis of the tube, said plate being square in outline and adapted to guide the film across the said aperture, a second apertured plate hinged at one edge to an edge of the first plate and having means to space the plates slightly so that when closed they will not press the film too tightly therebetween and a latch on one of the plates to secure the plates in closed relation, means for pulling the film through the space between the plates, said casing having an opening adjacent the film end of the tube, and means for covering said opening when taking pictures upon a sensitive film in said plates, and for uncovering said opening to present artificial light to said apertures when projecting pictures through said shutter.

11. In a combined motion picture camera and projector of the character described, the combination of a casing, film holding and actuating means, a frame supporting the actuating means within the casing and having an opening constituting a picture field, a lens tube within the casing mounted in alinement with said field, a shutter box fixed upon one end of said tube and having an opening therein registering with the tube opening, a shutter in said shutter box mounted for rotation across said tube end, said casing provided with swinging doors opening in the casing wall before the ends of the tube and a swinging door at the side of the casing opening into the interior of the same to permit insertion or removal of a wound film therefrom, and means for actuating the film across the end of the tube opposite the said shutter, the tube comprising telescopic cylindrical sections certain of which are threaded together and others slidably connected, at least one threaded section being adapted to engage a stationary threaded part at the tube end opposite the shutter, and the tube lenses carried by intermediate sections, whereby the sections may be inserted or detached from the interior of the casing by rotation of the proper sections, and the relative position of the lenses therein may be determined by endwise slidable movement of the sections.

12. In a combined motion picture camera and projector of the character described, the combination of a casing, film holding and actuating means, a frame supporting the actuating means within the casing, a lens tube within the casing securely but detachably and adjustably mounted within said casing, the latter provided with swinging doors opening the casing wall before the ends of the tube, said actuating means tending to move the film across one end of the tube, rotating shutter mechanism mounted within the casing to intermittently close the opening to the other end of said tube, whereby the film door of the casing may be closed and the shutter door opened when taking pictures by light passing through the tube from the shutter to the film, and both doors opened when artificial light is directed into the tube from the film toward the shutter end when projecting.

13. In a motion picture camera and projector of the character described, the combination of a casing, film holding and actuating means, a frame supporting the actuating means within the casing, a lens tube within the casing and mounted upon said frame in position for conveniently moving the film across one end of said tube, said actuating means tending to so move said film, a plate fixed exteriorly of the film end of the tube and having an aperture registering with the axis of the tube, said plate being square in outline and adapted to guide the film across the said aperture, a second apertured plate hinged at one edge to an edge of the stationary plate and having means to space the plates slightly so that when closed they will not press the film too tightly therebetween, a latch on one of the plates to secure them in closed relation, and means for pulling the film through the space between the plates.

14. In a motion picture camera and projector of the character described, a lens tube having means for mounting the same at its ends upon a frame structure and comprising telescopic cylindrical sections certain of which are threaded together and others slidably connected, at least one threaded section being adapted to engage a stationary threaded part at the tube end and on said mounting means, and suitable lenses mounted within certain intermediate sections, whereby the sections may be inserted in or detached from the interior of the mounting therefor by rotation of the proper sections, and the relative longitudinal position of the lenses therein may be fixed by endwise slidable movement of the sections.

15. In a combined motion picture camera and projector of the character described, the combination of a casing, film holding and actuating means, a frame supporting the actuating means, within the casing and having an opening constituting a picture field, a lens tube within the casing mounted in alinement with said field, a shutter box fixed upon one end of said tube and having an opening therein registering with the tube opening, a shutter in said shutter box mounted for rotation across said tube end, said casing provided with swinging doors opening in the casing wall before the respective ends of the tube, and means for actuating the film across the end of the tube opposite the said shutter.

In testimony whereof I hereunto affix my signature.

FRANK E. OILER.